United States Patent [19]
Esser et al.

[11] 3,731,790
[45] May 8, 1973

[54] PALLET RETRIEVING SYSTEM

[75] Inventors: George William Esser, West Orange; Webster W. Jury, Wayne, both of N.J.

[73] Assignee: North American Equipment Corporation, South Hackensack, N.J.

[22] Filed: Nov. 18, 1970

[21] Appl. No.: 90,543

[52] U.S. Cl. ................................. 198/219, 214/16 B
[51] Int. Cl. ............................................. B65g 25/04
[58] Field of Search .................... 198/218, 21, 19, 198/219; 214/16.1 CD, 38 C, 16 B

[56] References Cited

UNITED STATES PATENTS

| 3,417,879 | 12/1968 | Gough | 214/16 B |
| 3,568,818 | 3/1971 | Hanson | 198/218 X |
| 3,042,262 | 6/1963 | Brown et al. | 198/21 X |
| 3,455,434 | 7/1969 | Larkin | 198/21 |

Primary Examiner—Harvey C. Hornsby
Assistant Examiner—Douglas D. Watts
Attorney—Lerner, David & Littenberg

[57] ABSTRACT

A system is disclosed in which a motor driven retriever device brings loaded pallets deposited at a receiving station along a path to an unloading station. If another pallet is already positioned at the unloading platform station, the retriever device deposits its pallet as close thereto as possible. When a pallet is removed from the unloading platform station, pallets positioned therebehind are moved up to fill the void. The details of the pallet retriever device are disclosed showing how mechanical members and electrical switches are combined to provide the system of this invention.

42 Claims, 32 Drawing Figures

Patented May 8, 1973
3,731,790
9 Sheets-Sheet 1
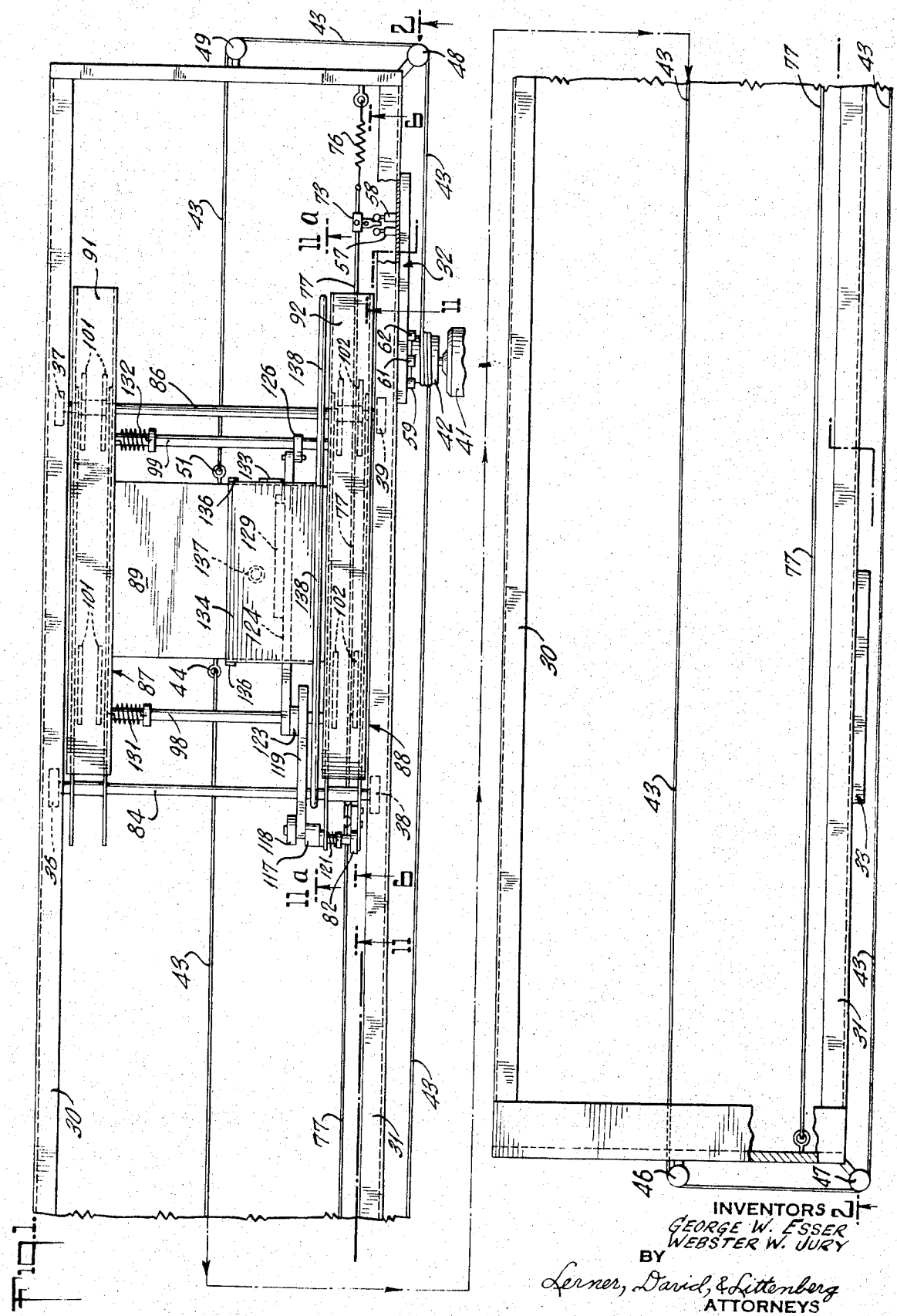
INVENTORS
GEORGE W. ESSER
WEBSTER W. JURY
BY
Lerner, David, & Littenberg
ATTORNEYS

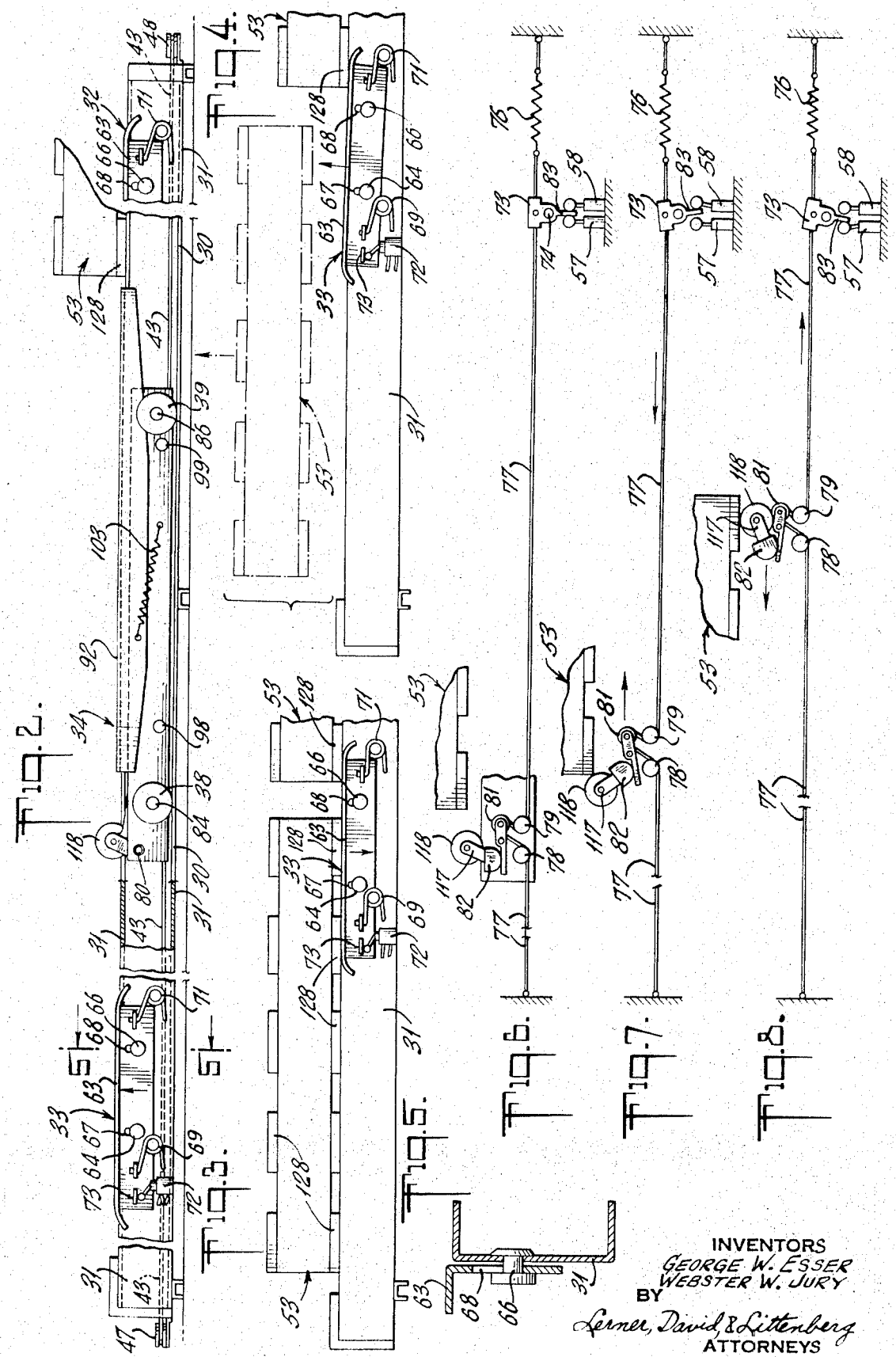

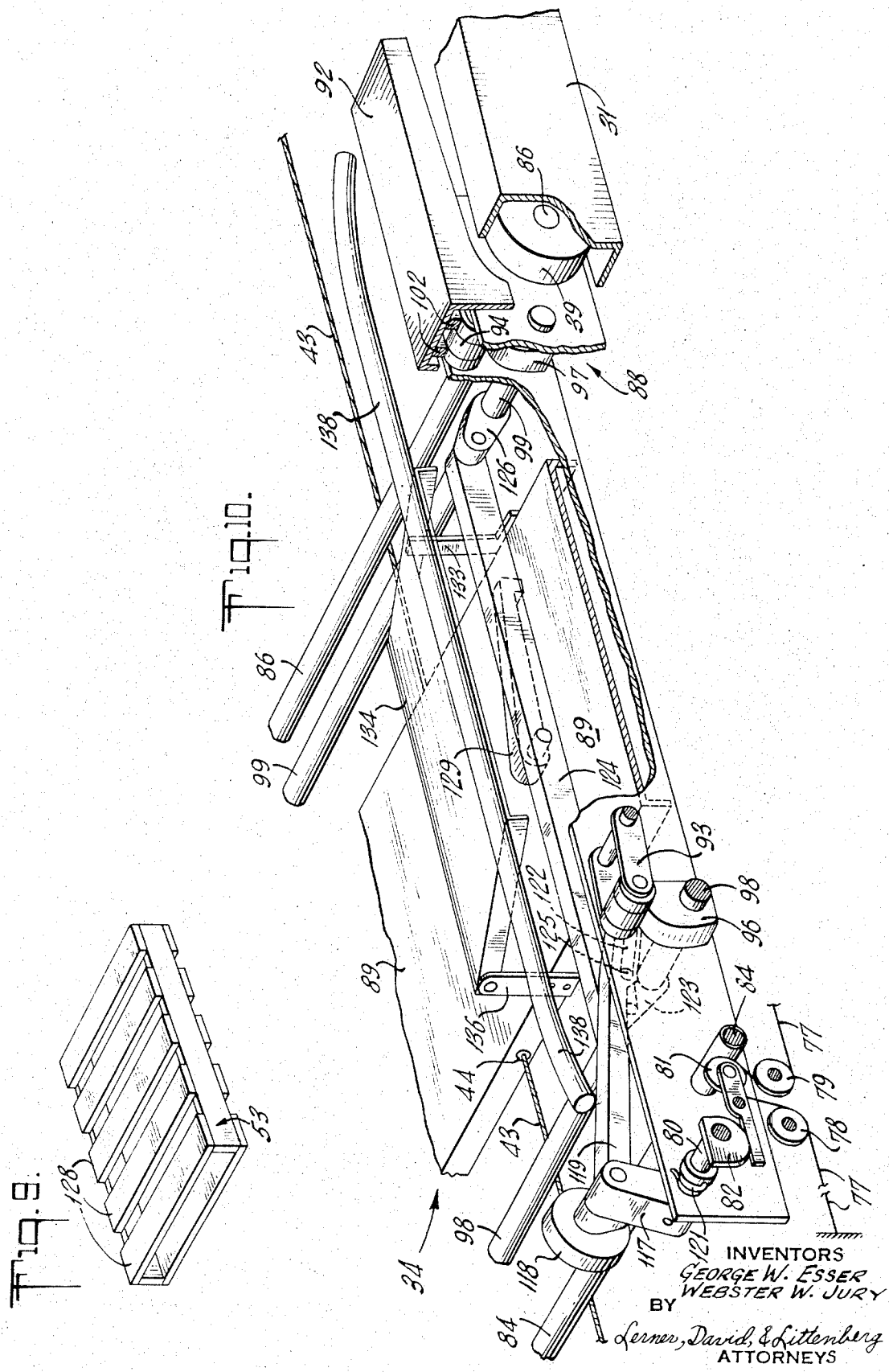

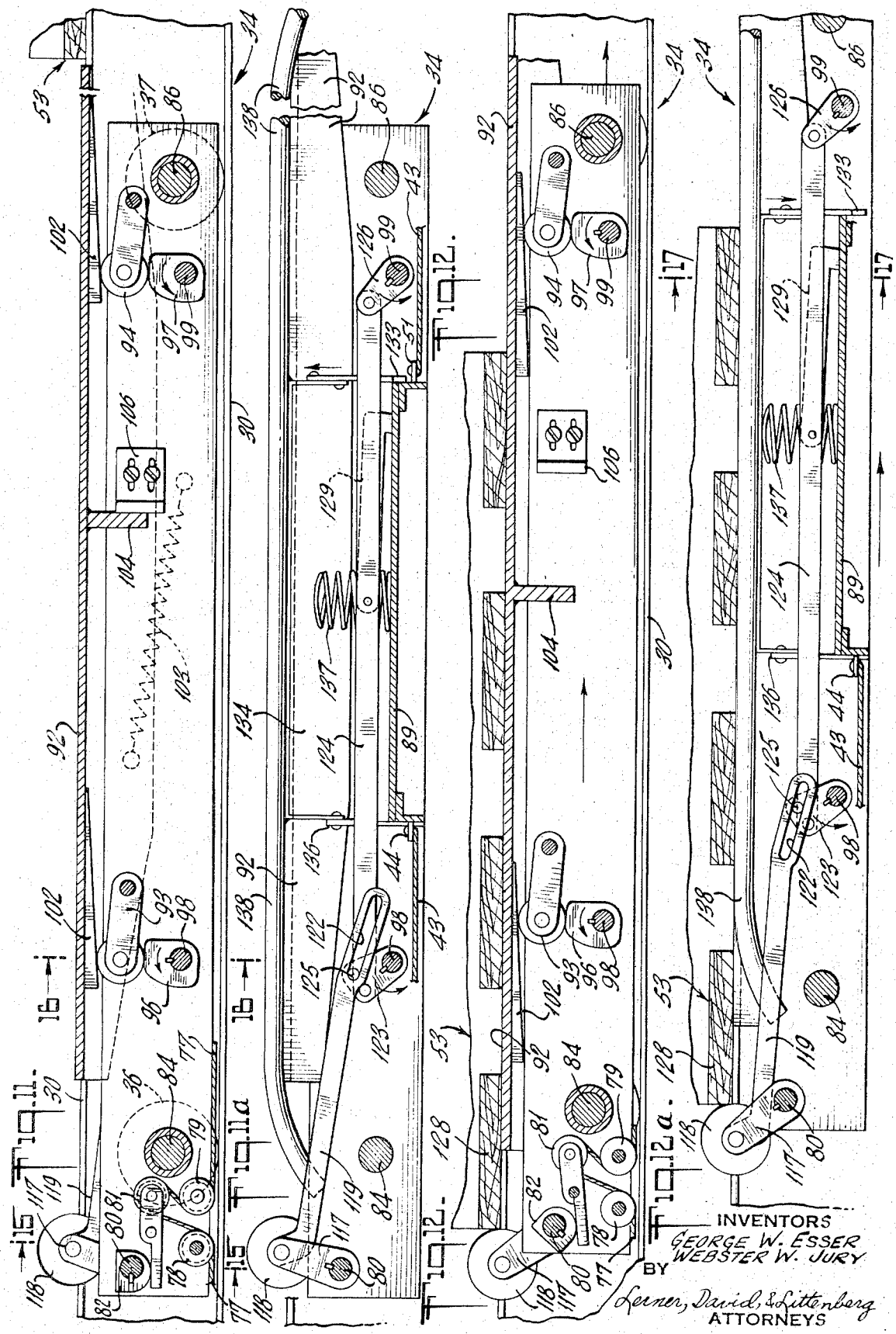

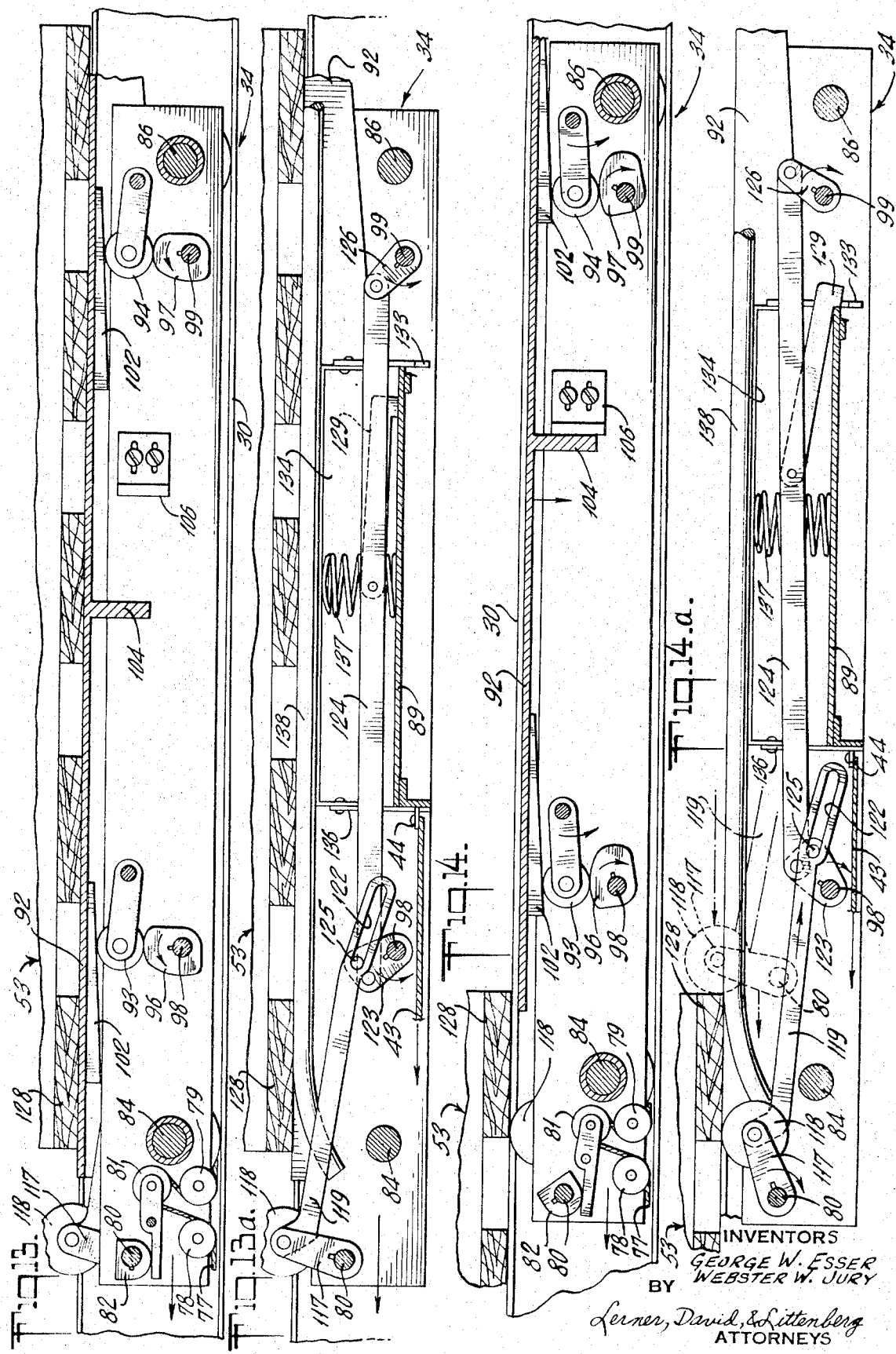

Patented May 8, 1973

INVENTORS
GEORGE W. ESSER
WEBSTER W. JURY
BY
Lerner, David & Littenberg
ATTORNEYS

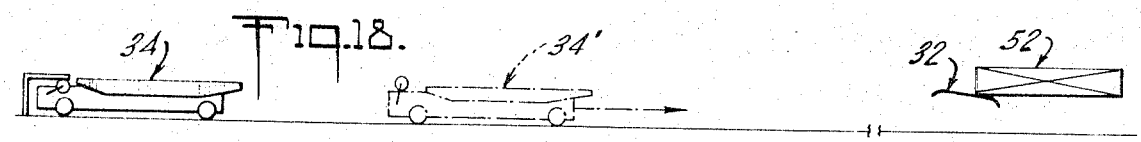
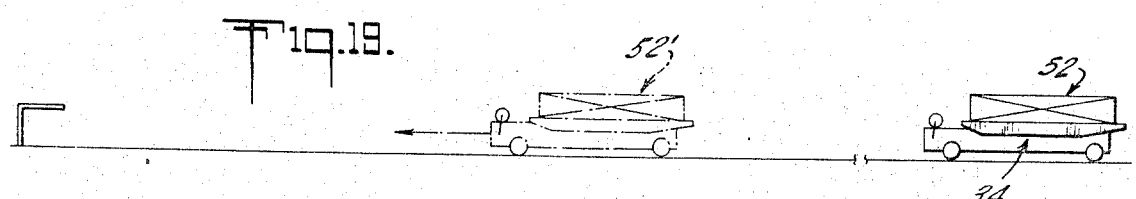
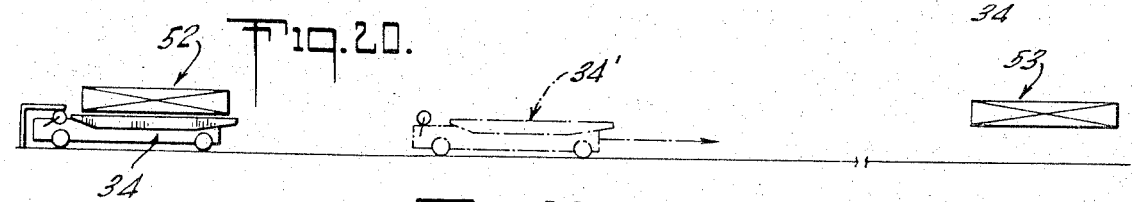
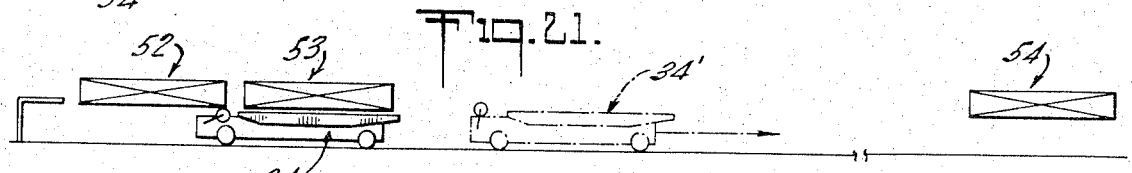
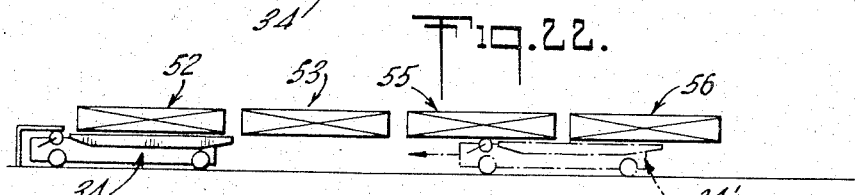
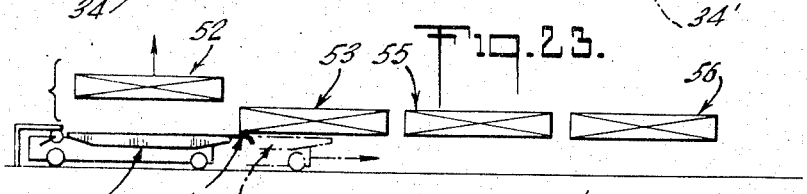
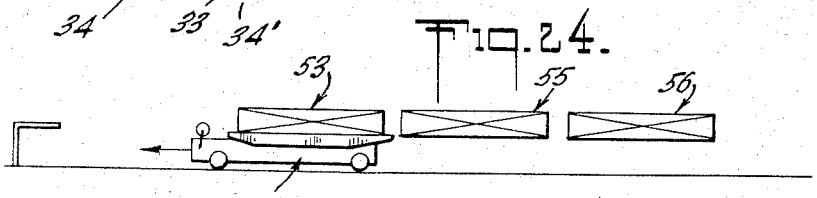
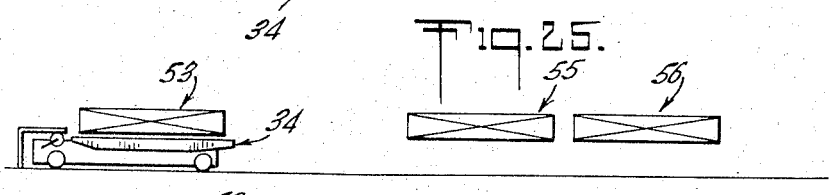
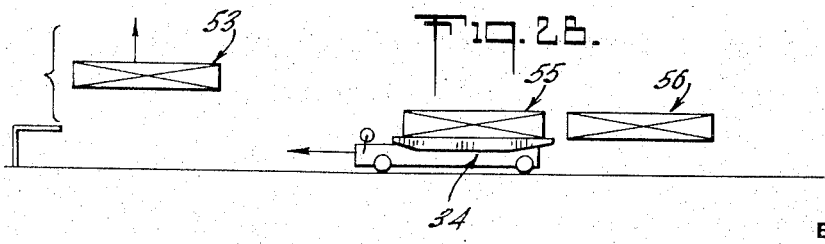

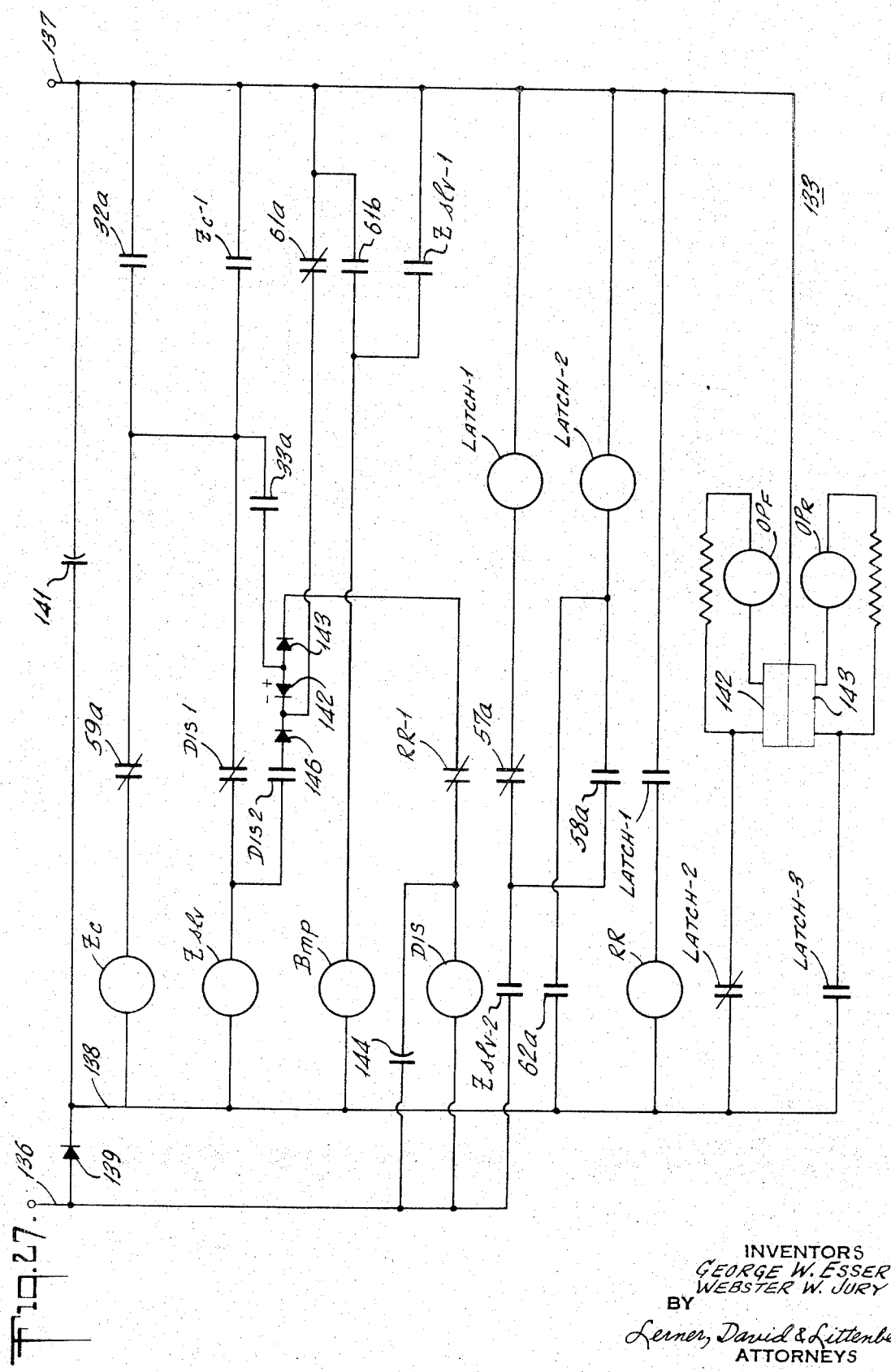

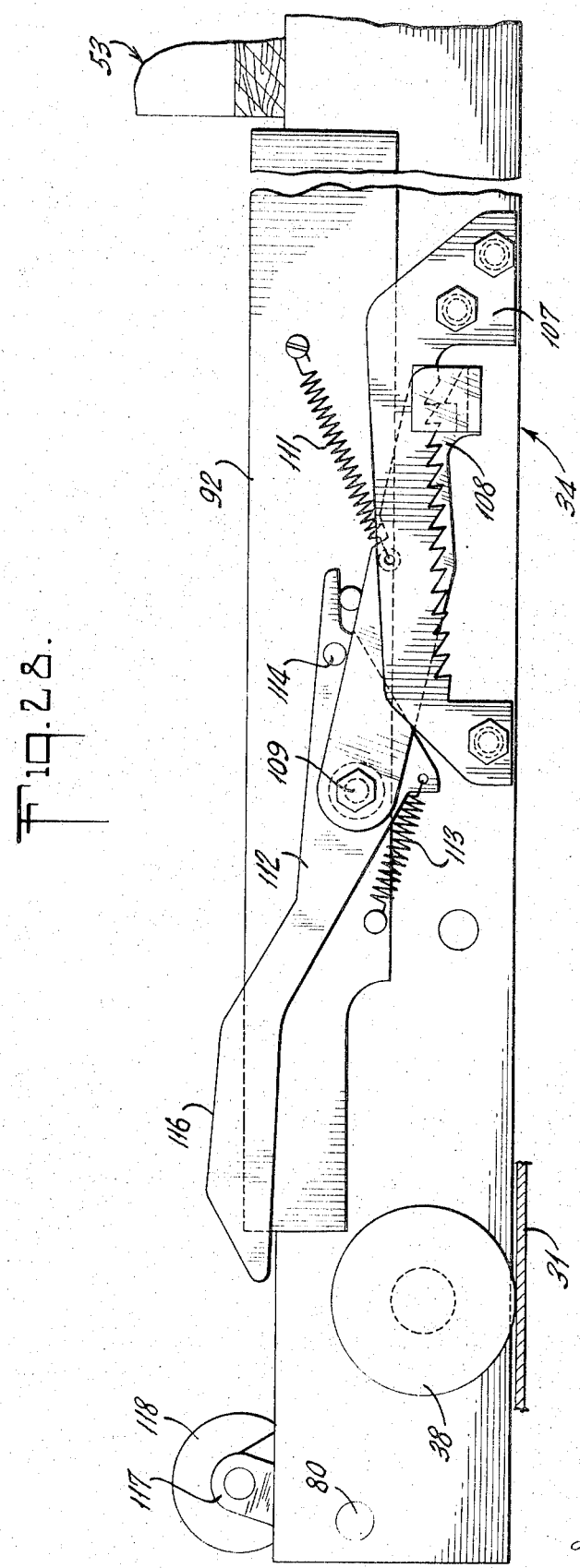

PALLET RETRIEVING SYSTEM

FIELD OF THE INVENTION

This invention relates to a system for moving loaded pallets from a receiving station to an unloading platform station and particularly to a system for moving loaded pallets along a prescribed path.

BACKGROUND OF THE INVENTION

Merchandise stored in warehouses are often kept on wooden pallet. When the merchandise is moved within the warehouse or to an unloading platform, the pallet is moved carrying the merchandise therewith.

One way of moving pallets employs a forklift truck which lifts the pallet and carries it to its new destination. When large numbers of pallets are to be systematically moved to an unloading platform, the use of a forklift truck to perform the entire task is not economical. One reason is that labor cost in such an operation is high. Secondly, when a plurality of pallets are moved to the unloading platform they are stacked one behind the other. When a pallet is unloaded from the unloading platform the remaining pallets stacked behind it must be moved up. This process is time consuming, wastes space and is therefore expensive.

As a result the function of moving pallets to an unloading platform is typically performed with conveyor systems. Conveyor systems have the advantage that the pallets move one behind the other and need not be continuously lifted up and put down. Most conveyor systems use power or gravity to move the pallets. The gravity systems must be mounted on an angle and therefore take up valuable space which could otherwise be used for warehousing purposes. The conveyor systems used in warehouses are also quite expensive because when moving heavy merchandise such as, for example, refrigerators, the tilted conveyor systems have breaking devices to prevent the pallets from developing too much momentum.

Motor driven continuous conveyor systems for moving goods to an unloading platform in warehouses because the spacing between pallets in such systems is dependent upon the position of the conveyor when a pallet is received thereby. Therefore, if two pallets are loaded on a conveyor and moved to the unloading platform, the space behind them cannot be filled without bringing those pallets back to the initial point.

Systems exist in the prior art for moving objects between predetermined points. Such systems are used for automatic moving of railroad cars and also for positioning work at work stations on assembly lines. These systems could not be easily adapted to the moving of pallets for two reasons. First, they operate on a cueing principle. In other words, objects to be transported are pushed from behind a predetermined distance. After a first object is pushed the predetermined distance a second object is placed behind it and pushed the same predetermined distance thereby cueing one object upon the other. The first object reaches the end of the line when a sufficient number of objects are pushed in behind it. Such systems do not operate to bring the first object to the desired position and then move up later applied objects behind the first.

The second drawback of these systems, when attempting to apply them to pallet retrieving, is the very nature of the pallet. Many pallets are formed from wooden slats having large open areas therebetween. Therefore, sensing and pushing members often employed in the above systems fall between the slats into the large spaces indicating to the equipment that no pallet is there when in fact one is present.

One obstacle to the building of a commercially acceptable automated pallet moving system arises from the nature of warehousing operations. The distance between a pallet receiving station and a loading station varies not only from warehouse to warehouse, but also from day to day in the same warehouse. A successful system must be susceptible of moving pallets between stations of different spacings without the need for major adjustment.

Therefore, it is an object of this invention to provide a system for moving pallets from a first point in a warehouse to a loading platform.

It is another object of this invention to provide a pallet moving system which requires a minimum of manual operation.

It is a further object of this invention to provide a pallet moving system in which all control functions are directed by switches mounted adjacnet the ends thereof and on a moving carriage so that the length of the system can be varied without changes in the operational portions thereof.

It is still a further object of this invention to provide a pallet moving system which operates in a level position.

It is another object of this invention to provide a pallet moving system which automatically moves the pallets so that they are compactly arranged adjacent to the unloading platform or are in the process of being so arranged.

It is still another object of this invention to provide a pallet moving system which can move pallets made from slats having spaces therebetween.

BRIEF DESCRIPTION OF THE INVENTION

With these and other objects in view, the present invention contemplates a system for transporting items deposited at a first station along a path to a second station on the path. The system will move an item deposited at the first station along the path to the second station if another item is not already at the second station and to other positions on the path between the first and second stations if the other item is present at the second station. If an item is present at one of the other positions and none is present at the second station, the system will transport the item at the one position to the second station and individually move any item which is at each of the additional positions closer to the second station.

The system is designed to give priority to the moving of items in the intermediate positions to the second station rather than moving of items from the first station to the second station.

The system is further designed so that the item moving mechanism always comes to rest at the second station when there are no items to be moved and will be activated when an item is placed at the first station or removed from the second station. The system, however, will not attempt to move an item from the first station if all the positions between the first and second stations are occupied.

In order for the item moving mechanism to reach its rest position at the second station from the first station a sensor is mounted thereon to enable the mechanism to drop below the items resting on the path when the mechanism approaches the resting items.

DESCRIPTION OF THE DRAWINGS

A more complete understanding of the invention can be had by reference to the following drawings and detailed description in which:

FIG. 1 is a top view of a pallet transporting system including a trackway and a carriage constructed in accordance with the teachings of this invention;

FIG. 2 is a side view of the system shown in FIG. 1;

FIGS. 3 and 4 are each side views of a front section of the system shown in FIG. 1 specifically showing a lever controlled switching arrangement in two states of operation;

FIG. 5 is a sectional view taken along the lines 5—5 in FIG. 2 showing details of the construction of the lever arrangements also shown in FIGS. 3 and 4;

FIG. 6 is a sectional view taken along the line 6—6 of FIG. 1 showing a proximity sensing mechanism and its mechanical interconnection to a pair of switches employed in the system of this invention for controlling the direction of movement of the carriage along the trackway;

FIGS. 7 and 8 show the structure shown in FIG. 6 in two different states of operation;

FIG. 9 is an isometric view of a pallet upon which merchandise is transported in accordance with this invention;

FIG. 10 is an isometric view of the carriage seen in FIG. 1 showing more clearly the interrelationship of certain mechanical elements;

FIGS. 11 and 11a are sectional views taken along the lines 11—11, 11a—11a of FIG. 1 showing details of the carriage shown in isometric view in FIG. 10 with mechanical elements in a rest position;

FIGS. 12 and 12a are sectional views analogous to FIGS. 11 and 11a respectively showing the details in a first activated position;

FIGS. 13 and 13a are sectional views analogus to FIGS. 11 and 11a respectively showing the details of the carriage in a second activated position;

FIGS. 14 and 14a are sectional views analogous FIGS. 11 and 11a respectively showing the details of the carriage in a third activated position;

FIGS. 18 through 26 show schematically the pallet transporting system of FIG. 1 in varying slats of operation;

FIG. 27 is a schematic diagram showing the control circuit for operating the system shown in FIG. 1; and FIG. 28 is a side view of a ratchet mechanism employed in one embodiment of this invention.

DETAILED DESCRIPTION OF THE INVENTION

Figure 15:
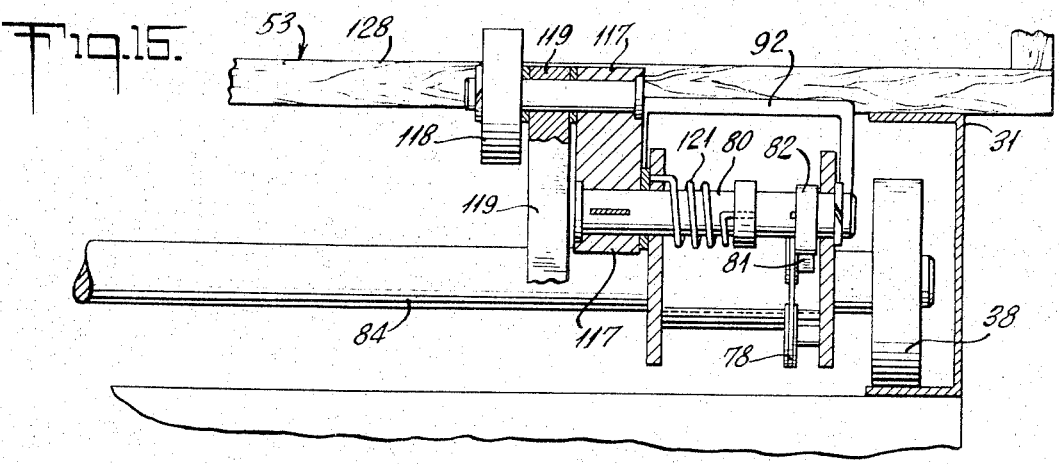
FIG. 15 is a sectional view taken along the line 15—15 in FIG. 11 showing additional details of the carriage in its rest position.

Referring now to FIG. 1, we see a system for transporting merchandise along a path defined by a pair of channeled rails 30 and 31. The merchandise is loaded on pallets, such as the one shown in FIG. 9 and moved between a first station, defined on the path by a lever switch assembly 32 mounted on the rail 31, and a second station, defined on the path by a second lever switch assembly 33 also mounted on the rail 31.

A carriage 34 is mounted to ride on wheels 36 through 39 along the channeled rails 30 and 31. The carriage 34 is driven along the path by a motor 41 which is connected thereto through a drum 42 and a cable 43. The cable 43 is connected to one side of the carriage 34 at an eyelet 44 and extends along the path defined by the rails 30 and 31 to a pair of pulleys 46 and 47. The cable 43 runs from the pulley 47 to and around the drum 42 to a second pair of pulleys 48 and 49. The pulley 49 guides the cable 43 back to the second side of the carriage at an eyelet 51. In this way, the carriage 34 can be positively driven in both directions by the motor 41. The length of the cable 43 exposed remains constant by having the same amount being taken up on the drum 42 as is being let out therefrom. It should be noted at this time that the above described positive drive mechanism allows one to determine the position of the carriage 34 by sensing the angular or rotational status of the drum 42.

Referring now to FIGS. 18 through 26, we see in caricature form an illustration of some of the basic functions performed by the system of this invention. In FIG. 18, we see in solid lines, the carriage 34 in its normal rest position at the front of the path defined by the rails 30 and 31. When a first pallet 52 is placed at the first station defined by the lever switch assembly 32, the carriage 34, in dashed line, is sent to engage the pallet 52.

In FIG. 19, we see the carriage 34 about to engage the pallet 52. When engagement is made the direction of the carriage 34 is reversed so that we see the dashed carriage 34 and pallet 52 going toward the front of the path. In FIG. 20, we see that when the carriage 34 reaches the front of the path it stops, drops the pallet 52 and reverses direction towards the first station. If there is a second pallet, as there is in FIG. 20, pallet 53, the carriage 34 (see FIG. 21) brings the pallet 53 to rest behind the pallet 52. The carriage 34 then reverses direction to look for additional pallets at the first station if a new pallet has been placed at the first station. In FIG. 21, we see the carriage 34 going to pickup the third pallet 54. FIG. 22 shows that after the carriage 34 travels to the first station and finds no pallet then it comes to rest at the front of the path.

FIGS. 23 through 26 show that the carriage 34 will be activated by the removal of the pallet 52 (see FIG. 23) from the second station, defined by the lever switch assembly 33, to individually move the pallets 53, 55, and 56 to fill the void left by the removal of the pallet 52. The carriage 34 will continue to move the pallets up to fill the void until no pallet remains on the path. Then the carriage 34 will travel passed the first position and return to assume its normal rest position at the front of the path.

The system is further configured to cancel a work assignment of bringing pallets from the first station as shown in FIGS. 18 through 22 if a pallet is removed from the second station while a second pallet rests therebehind creating a void at the front of the path. This is preferable to having the system stack pallets from the first position behind a row of pallets with a void there in front. Otherwise, it would be necessary for the carriage 34 to move all the pallets on the path to fill the void after the first station was freed of pallets increasing the number of trips which the carriage 34 would make to move all the pallets adjacent to the front of the path.

The above functions are achieved in the preferred embodiment of this invention through the interrelationship of electrical circuitry and mechanical elements. It should be understood, however, that many of the functions performed by the circuitry could be performed by mechanical elements while some of the functions performed by the mechanical elements could be performed by circuitry.

The circuitry shown in FIG. 27 operates the motor 41 (starting, stopping and reversing the same) in response to seven switches interconnected mechanically with the mechanical structure. The seven switches can be looked upon as three groups. The first group includes two switches. One is contained in the lever switch assembly 32 while the second is contained in the lever switch assembly 33. These switches are employed to actuate the system in response to pallets being placed or removed at the first or second station respectively. The second group of switches (see FIGS. 6, 7, and 8) include switches 57 and 58 which ultimately sense the carriage 34 coming into a predetermined proximity with a pallet or other properly configured item on the path. The third group of switches includes three switch assemblies 59, 61, and 62 for sensing predetermined positions of the carriage 34 by monitoring the rotational condition of the drum 42 (for example, by counting the number of rotations thereof from a predetermined rest position).

The first and second groups of switches are activated through mechanical interactions particularly suited for motor driven retriever devices. An example of the first group of switches which includes the lever switch assemblies 32 and 33 is seen in FIGS. 2, 3, 4 and 5. The lever switch assembly 33 includes a lever plate 63 affixed to the channel 31 by a pair of lugs 64 and 66. The lugs 64 and 66 are fixedly seeded in the channel 31. The lugs 64 and 66 protrude through slots 67 and 68 in the lever plate 63. A pair of spring members 69 and 71 urge the lever plate 63 upwardly into the path. A switch element 72 is mounted in fixed relationship to the channel 31 to be actuated by a member 73 which protrudes from the lever plate 63.

The lever plate 63 defines the second station by being situated so that a pallet which is brought to the end of the path will have a back end thereof resting in the middle of the lever plate 63. In a like manner, the lever plate on the lever switch assembly defines the first station in that pallets placed on the first station will be rested with the front end thereof halfway onto the lever thereof. When the lever plate 63 has no pallet thereon as shown in FIG. 2, the springs 69 and 71 urge the lever plate 63 upward. In this position, the switch 72 provides a normally opened contact. If the lever plate 63 is urged downwardly by pallets either on the front portion further pressing downward on the switch 72 or on both sides thereof also pressing downward on the switch 72, the switch 72 will still provide the normally opened contact. If, however, a pallet is absent from the front portion of the lever plate 63 and present on the back portion thereof, the spring 71 will be depressed pushing the back portion of the lever plate 63 downwardly and pivoting the lever plate 63 around the lug 64 urging the front end of the lever plate 63 upward away from the switch 72 to close the contact therein. The lever switch assembly 33 therefore will operate to provide a closed contact only when a pallet is present at the next to the last position on the path and no pallet is present at the second station. In a like manner, the lever switch assembly 32 will provide a closed contact only when a pallet is present at the first station and no pallet is present at the posiiton immediately adjacent thereto.

It should be noted that in this way, the mechanical elements including the lever plate 63 pivoted on the channel 31 and urged upwardly by the springs 69 and 71 provide a logical function which could be performed by a less complicated mechanical structure and more complex electronic circuitry. This mechanical combination is capable of sensing the absence of a pallet on the front of the lever plate 63 and the presence of one on the back end. This combination of absence on the front and presence on the back is the only conditions which will activate the switch 72. It should be noted that a single pivot point could logically perform the same function but would not be as mechanically stable. The relative strength of the springs 69 and 71 would then come into play to determine if the switch 72 were in fact in an opened or closed position.

The second group of switches 57 and 58 are operated by a pivoted actuator 73 (see FIGS. 6, 7, 8 and 10) mounted on a lug 74 which is fixed in relationship to the path. The actuator 73 has a finger 83 extending therefrom to contact the switches 57 and 58. One side of the pivoted member 73 is connected to a spring in tension 76. The other side of the pivoted member 73 is connected to a guy wire 77.

The guy wire 77 is threaded around a pair of rollers 78 and 79 mounted on the carriage 34. A pivoted roller 81 takes up the portion of the guy wire 77 between the rollers 78 and 79. A cam 82 rotatably mounted on the carriage 34 by a shaft 80 holds the pivoted roller 81 in predetermined positions dependent upon the angular position thereof. The tension of the guy wire 77 is initially adjusted so that if the pivoted cam member 82 is as shown in FIG. 6, the finger 83 on the actuator 73 will not contact either of the switches 57 or 58. It should be noted that the distance from the pivot point of cam 82 is larger to the left side thereof than to the right and the distance from the pivot point to the surface varies continuously therebetween.

Therefore, in FIG. 7 when the cam 82 is rotated in a counterclockwise direction the left side thereof raises the roller 81 increasing the tension on the guy wire 77. The increase tension pivots the actuator 73 so that the finger 83 thereof operates the switch 58. In a like manner, when the cam 82 is rotated in a clockwise direction, see FIG. 8, the tension in the guy wire 77 is reduced so that the finger 83 thereof operates the switch 57.

Referring now to FIGS. 1 and 10, to see details of the carriage 34, we see that the wheels 36 through 38 and 39 are mounted on shafts 84 and 86. The carriage 34 includes a pair of contacting assemblies 87 and 88 joined together by a center plate 89. Each of the contacting assemblies 87 and 88 carry a contacting shoe 91 and 92 respectively. The contacting shoes 91 and 92 ride on roller carrying arms which are positioned by cam members. For example, the contacting shoe 92 rides on roller carrying arms 93 and 94 which are positioned by cam members 96 and 97. The cam members 96 and 97 which position the roller arms 93 and 94 and the cam members which position the roller arms of the cam members not shown are mounted on and moved by a pair of shafts 98 and 99 respectively. The underside of the contacting shoes 91 and 92 which engage the roller arms have wedged shaped members 101 and 102 connected thereto extending downwardly and to the left.

Referring now to FIG. 11, we see a view taken through the center of the contacting shoe 92 to show in more detail the carriage in its normal or rest position. A spring 103 biases the contacting shoe 92 in the righthand direction so that it rides up on the roller arms 92 and 93 and a portion thereof extends above the rails 30 and 31. A downwardly extending flange 104 on the underside of the contacting shoe 92 resets against an angle plate 106 mounted on the carriage 34 to limit the rightward movement of the shoe 92.

The spring 103 is a relatively weak spring having only sufficient strength to lift the weight of the contacting shoe 92 up and to the right as it pulls the contacting shoe 92. Therefore, if the carriage 34 as seen in FIG. 11 were moved to the right; the edge of the contacting shoe 92 extending above the rail 31 would be stopped by the pallet 53 resting on the rails 30 and 31. As the carriage 34 continued to travel to the right, the contacting shoe 92 would remain stationary relative to the path but move leftwardly relative to the carriage 34 thus sinking downwardly as the roller arms 93 and 94 move under the surface 102. When the contacting shoe 92 had dropped below the pallet 53, it would then again move with the carriage 34 under the pallet 53 against the bottom side thereof. Each time frictional forces between the upper surface of the shoe 92 and the bottom surface of the pallets 53 would tend to stop the rightward movement of the shoe 92; the shoe 92 would again drop sufficiently to move again with the carriage. Therefore, one can see that a sort of slight jerking motion would occur as the shoe 92 slid under the pallet 53.

If the direction of the carriage 34 were reversed when the carriage 34 was under the pallet 53 (see FIG. 13) the rollers of the roller arms 93 and 94 would push against the surfaces 102. Since the spring 103 draws the contacting shoe 92 upwardly and to the right, the contacting shoe 92 will be pressing against the underside of the pallet 53. As the carriage 34 attempted to move to the left and carry the contacting shoe 92 therewith, the frictional forces between the pallet 53 and the contacting shoe 92 would be sufficient so that the contacting shoe 92 would attempt to pull the pallet 53 therewith. The pallet 53, however, will rest on the rails 30 and 31 and would tend to impede the forward movement of the shoe 92 due to the frictional forces between the pallet 53 and the rail 31.

Therefore, as the carriage 34 begins its motion to the right the roller bearing arms 93 and 94 will push against the surfaces 102 tending to raise the pallet 54 slightly off the rails 30 and 31. The raising of the pallet 53 off the rails will substantially reduce the amount of force necessary to move the pallet 53 forward and will therefore result in easy transport of the pallet 53 slightly above the rails 30 and 31.

It has been found that the above arrangement is sufficient to transport pallets carrying relatively light loads thereon, for example in the range of 100 pounds. The pallet 53 will alternately rise up off the rails 30 and 31 and then as a steady state motion is achieved, be touched back down on the rails. At this point frictional forces will again develop which will again raise the pallet 53 up off the rails.

It has been further found, however, that with heavier loads, for example in the range of 1,500 pounds, the touching down of the pallet 53 will tend to cause wear on the rails 30 and 31 as well as produce a bumping action. Therefore, in one embodiment of this invention a ratchet mechanism (see FIG. 28) is incorporated in the contacting assemblies 87 and 88 to hold the shoes 91 and 92 respectively at their highest most point of rise after being under the pallet 53. The ratchet mechanism holds the shoe 91 and 92 up until they are otherwise disengaged from the underside of the pallet 53.

The ratchet, seen in FIG. 28, has three principal parts. The ratchet mechanism itself includes a fixed ratchet element 107, fixedly secured to the carriage 34 cooperating with a pivoted ratchet element 108, pivotally secured to the shoe 92 by a shoulder screw 109. A ratchet spring 111 biases the pivotally mounted ratchet element 108 against the fixed ratchet element 107. A release bar 112 pivotally mounted on the shoe 92 and having a hold down pin 114 thereon is biased by a release bar spring 113 to normally hold down the pivoted ratchet element 108 out of engagement with the fixed ratchet element 107. It should be understood that a similar ratchet mechanism would be employed on the carriage 34 to hold the shoe 91.

The release bar 112 has a contact surface 116 which extends above the top of the shoe 92 when holding the pivoted ratchet element 108 out of engagement with the fixed ratchet element 107. When the carriage 34 moves under a pallet 53 as described with respect to FIGS. 11 to 13, the underside of the pallet 53 pushes against the contact surface 116 raising the hold down pin 114 and allowing the ratchet spring 111 to bring the pivoted ratchet element 108 into engagement with the teeth on the fixed ratchet element 107. As the carriage 34 reverses direction as shown in FIG. 13 to raise the pallet 53 under the shoe 92 off the rails 30 and 31, the pivoted ratchet element 102 advances along the teeth of the fixed ratchet element 107 holding the shoe 92 in its uppermost position.

It should be clear that the ratchet will not release until the contact surface 116 on the release bar is allowed to rise up above the top of the contact shoe 92 pushing the pivoted ratchet member 108 out of engagement with the fixed ratchet member 107.

The carriage 34 is configured to drop the shoes 91 and 92 out of engagement with the underside of the pallet 53 when the carriage 34 encounters a pallet or other item such as the front of the path having characteristics such as a pallet at the left side thereof. The carriage 34 (see FIG. 10) has a sensor arm 117 securely fastened to the shaft 80. A sensor head 118 is secured to the sensor arm 117. In addition to rotating the cam member 82 for providing electrical signals in the form of contact openings and closures in the switches 57 and 58, the sensor arm 117 and sensor head 118 carries a sensor linkage 119 therewith. A spring 121 (see FIGS. 1 and 10) positions the sensor arm 117 into its normal rest position.

FIG. 11a is a sectional view showing the sensor arm 117, sensor head 118 and the sensor linkage 119, and additional linkages operative therewith in their normal rest position. The sensor linkage 119 has a slotted section at the right end thereof 122. A pivoted cam follower 123 pivotally mounted on the shaft 98 has a pin 125 thereon to ride in the slot 122 of the linkage 119. The cam follower 123 is pivotally connected to a connecting linkage 124 which drives a follower member 126 to rotate the shaft 99 to essentially the same position maintained by the shaft 98.

Referring now to FIGS. 12 and 12a, we see that when the carriage 34 rides under the pallet 53, the sensor head 118 rotates the sensor arm 117 in a counterclockwise direction when contact is made between the pallet 53 and the sensor head 118. This rotates the cam member 82 to actuate the switch 58 and to drive the sensor linkage 119 to the left. The sensor linkage 119 (see particularly FIG. 12a) when moving to the left does not transmit any movement to the cam follower 123 but rather slides in the slot 122 thereof.

Referring now to FIGS. 14 and 14a, we see that when the sensor head 118 engages a pallet 53 or the like when the carriage 34 is moving from left to right, the sensor head 118 in addition to rotating the shaft 80 actuating the switch 57, pushes the sensor linkage 119 to the right pushing the cam follower 123 in counterclockwise direction. The motion of the cam follower 123 is reflected in the linkage 124 rotating the member 126 and therefore the shaft 99. In FIG. 14, we see that the cam elements 96 and 97 carried by the shafts 98 and 99 respectively rotate therewith allowing the roller arms 93 and 94 respectively to drop removing the shoe 92 from engagement with the underside of the pallet 53. This will, of course, release the ratchet so that the spring 103 can bring the shoe 92 to the position shown in FIG. 14.

Looking now at FIGS. 9 and 10, we can see that the pallet 53 is constructed from spaced-apart slats 128. It has been found that the sensing head 118 may fall between the slats 128 or if a pallet 53 has a broken or missing slat, the sensing head 118 will rise up in the middle of the pallet 53 engaging the shoes 91 and 92 at a time when in fact they should be disengaged from the pallet 53.

Figure 16:
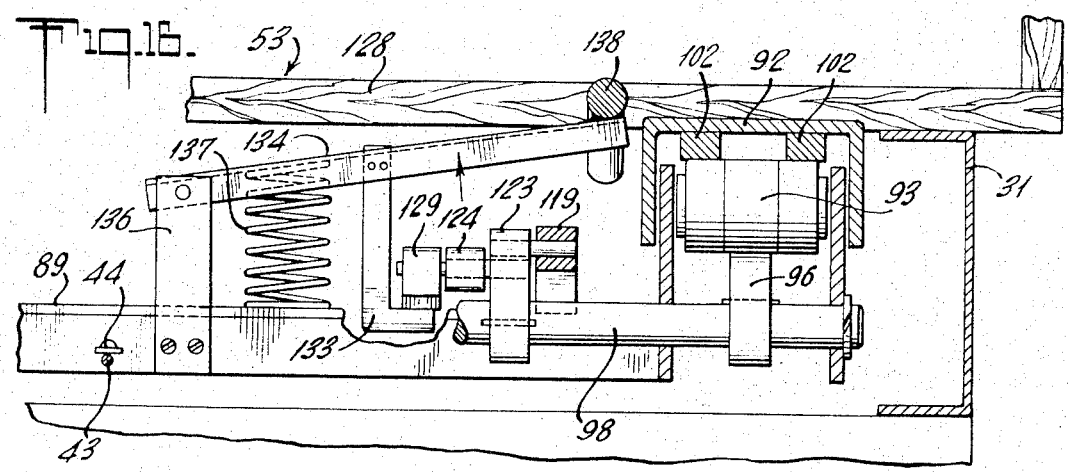
FIG. 16 is a sectional view taken along the line 16—16 in FIG. 11 showing additional details of the carriage in its rest position.
Figure 17:
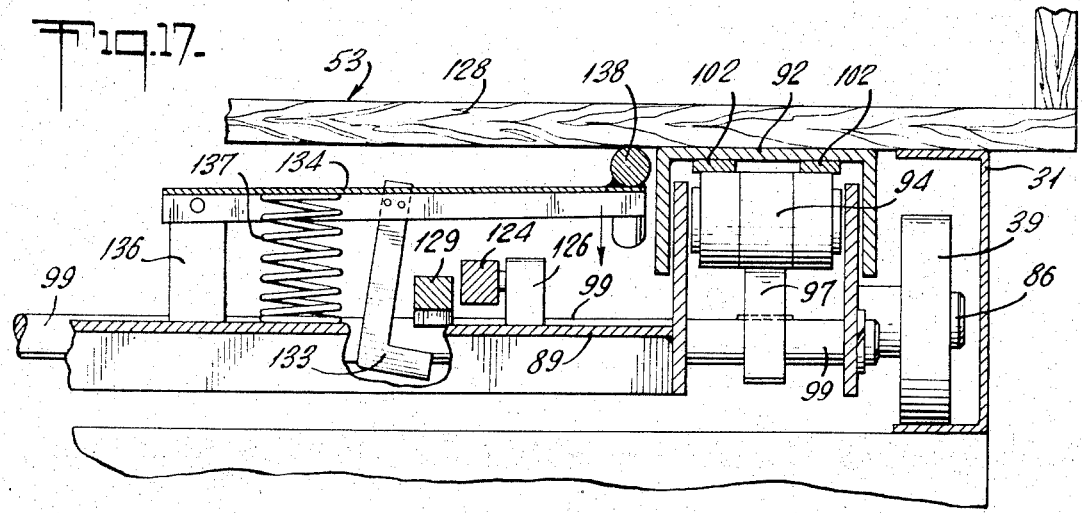
FIG. 17 is a sectional view taken along the line 17—17 of FIG. 12a showing additional details of the carriage in its first activated position.

In accordance with this invention, to overcome this problem, a latch mechanism seen in FIGS. 10, 11a, 12a, 13a, 14a, 16 and 17 has been incorporated. When the sensing head 118 contacts a pallet when moving in a leftwardly direction as shown in FIG. 14, a latching arm 129 engages the center plate 89 holding the linkage 124 and all the elements attached thereto to the right against the force of springs 131 and 132 (seen clearly in FIG. 1) even if the sensing head 118 should encounter a space on the underside of the pallet 53. A latch release member 133 is carried by a latch release plate 134 (see particularly FIGS. 10, 16 and 17). The latch release plate 134 is pivotally mounted on the carriage 34 on a bracket 136. A latch release spring 137 urges the latch release plate 134 upwardly so that the latch release member 133 can engage the latch linkage 129 lifting it off the center plate 89 allowing the springs 131 and 132 (see FIG. 1) to return the linkages 124 and the elements carried therewith to their normal rest position shown in FIG. 11a.

A latch bar 138 is attached to the top side of the latch hold down plate 134. When the carriage 34 begins to go under a pallet 53 (see FIG. 16) one of the curved portions of the latch bar 138 slides under the pallet and is thereby cammed downwardly to depress the latch release plate 134 and the latch release member 133 therewith compressing the spring 137. So long as the bar 138 is in contact with the underside of the pallet 53, the latch linkage 129 will not be released notwithstanding the fact that the sensing head 118 is no longer in contact with the underside of the pallet 53. When, however, the bar 138 is no longer under the pallet 53, indicating that the carriage 34 is completely away from the pallet 53, the spring 137 will push up the latch release plate 134 lifting up the latch release member 133 to disengage the latch linkage 129 from the center place 89 allowing the springs 131 and 132 to return the linkages to their normal rest position.

Referring now to all the Figures and particularly to FIG. 27, we see a control circuit 133. The control circuit 133 controls the motor 41 which moves the carriage 34 along the path defined by the rails 30 and 31 in response to predetermined patterns of pallets arranged thereon. The movements of the carriage 34 dictated by the logic built into the control circuit 133 enables the mechanical features described above to cooperate with each other and with pallets to compactly arrange pallets deposited near the lever switch assembly 32 adjacent to the front of the path.

The control circuit 133 is shown in FIG. 27 with all contacts in the positions they occupy when the carriage is at rest at the front of the path. When the carriage is at rest at the front of the path is depressed to the right (see FIGS. 14 and 14a) under a shelf type member 134 which defines the front of the path.

The control circuit 133 operates off both AC and DC voltages. The AC voltage is supplied on a pair of leads 136 and 137. The DC voltage is supplied between a lead 137 and a lead 138. Lead 138 is positive with respect to the lead 137. A diode 139 connecting the lead 136 to the lead 138 rectifies the AC voltage. A capacitor 141 filters the rectified AC voltage to supply the positive voltage on the lead 138 with respect to the lead 137.

In operation when a pallet is placed in the first position on the path, as defined by the right half portion of the lever switch assembly 32, a normally opened contact 32a is closed applying power to the coil of a relay $Z_c$ through a normally closed contact 59a of the limit switch 59. Energization of the relay $Z_c$ closes a normally opened contact $Z_c$-1. The closing of the contact $Z_c$-1 energizes the coil of a relay $Z_{slv}$ through a normally closed contact DIS-1 of a relay DIS.

The energization of the relay $Z_{slv}$ closes two normally opened contacts $Z_{slv}$-1 and $Z_{slv}$-2. The closing of the $Z_{slv}$-1 contact supplies DC power to a relay coil $B_{mp}$. The $B_{mp}$ contacts (not shown) apply power to a circuit (not shown) for energizing the motor 41. The closing of the $Z_{slv}$-2 contact applies AC power to the contacts 57a and 58a associated with the switches 57 and 58 to determine the direction in which the power supplied by the $B_{mp}$ relay will drive the motor 41.

Since the pallet is at the front of the path with the sensing head depressed to the right, the tension is decreased in the guy wire 77 so that the contact 57a will be closed. Therefore, the closing of the $Z_{slv}$-2 relay applies power to a latch $C_1$ coil of a latch relay.

The energization of the latch $C_1$ coil opens normally closed contacts latch–1 and latch–2 while closing a normally opened contact latch–3. The opening of the latch–2 contact de-energizes an $OP_r$ relay coil and closes an $OP_f$ relay coil. The $OP_r$ relay coil operates contacts (not shown) for energizing the motor 41 to operate in reverse while the $OP_f$ coil operates contacts (not shown) for operating the motor 41 in a forward direction. Forward operation of motor 41 is to be understood as operation which would drive the carriage 31 towards the end of the path adjacent to the lever switch assembly 32 while a reverse operation of the motor will be understood to mean one which would operate the motor 41 to drive the carriage 34 towards the end of the path adjacent to the lever switch assembly 33.

A pair of delay circuits 142 and 143 are interposed between the contacts latch–2 and latch–3 and the relay coils $OP_r$ and $OP_f$ respectively to provide approximately a one second delay between the time one of the respective OP relays opens its contacts and the other closes its contacts. This is in order to allow the motor 41 to come to a natural stop before power is supplied thereto to drive it in its opposite direction.

When the motor 41 begins to turn the drum 42 taking up and letting out the cable 43, the carriage 34 proceeds from the end of the path adjacent the shelf 134 towards the pallet resting on the lever switch assembly 32. When the carriage moves away from the shelf 134, the contact 58a is opened so that now both the contacts 57a and 58a are opened. The latch relay, however, will maintain the state of its contacts until energization is applied to the coil latch $C_2$. At the same time a normally closed contact 61–a opens and a normally opened contact 61–b closes in response to rotation of the drum 42 beyond a predetermined limit position. The closing of the contact 61–b now provides a parallel path with the contact $Z_{slv}$–1 to hold the relay coil $B_{mp}$ energized.

When the sensing head 118 on the carriage 34 engages the pallet resting on the lever switch assembly 32 as shown in FIG. 12, the cam 82 increases the tension on the guy wire 77 operating the switch 58 to close the contact 58a actuating the coil latch $C_2$ of the latch relay again closing the contacts latch–1 and latch–2 and opening the contact latch–3. The opening of the contact latch–3 de-energizes the relay $OP_f$, while the closing of the latch–2 contact energizes the relay $OP_r$ thereby reversing direction of the motor 41 after a one second delay.

The carriage 34 then moves to the left (see FIG. 13) restoring the sensor head to its normal rest position thereby restoring normal tension to the guy wire 77 so that the contacts 57a and 58a are both open and bringing the pallet up off the rails 30 and 31 to move with the carriage 34. When the carriage 34 passes a position defined by the switch 59, the contact 59a will be opened.

The limit switches 59 and 62 are configured so that the limit switch 59 will only be operated when the carriage is moving from the right to the left as shown in FIG. 1. The opening of the limit switch contact 59a de-energizes the relay $Z_c$ opening the contact $Z_c$–1 de-energizing the relay $Z_{slv}$ thereby opening the contacts $Z_{slv}$–1 and $Z_{slv}$–2.

The opening of the contact $Z_{slv}$–2 renders the contacts 57a and 58a unable to effect the state of the latch relay. The opening of the contact $Z_{slv}$–1 has no immediate effect because it is bypassed by the limit switch contact 61–b holding the $B_{mp}$ relay energized so that the motor 41 will continue to drive the carriage 34 towards the front of the path.

When the sensor head 118 contacts the pallet resting at the front of the path, the carriage 34 will assume the state shown in FIGS. 14 and 14a. As discussed above the decreased tension in the guy wire 77 will close the contact 57a. Since, however, the $Z_{slv}$–2 contact is now opened the closing of the contact 57a will not alter the direction of the carriage 34. The sensing head 118, however, will be effective to drop the shoes 91 and 92 to a position where they are unable to engage the pallet so that the carriage 34 will ride under the pallet at the end of the path and continue to move forward until the limit switch operates opening the contact 61b removing power from the $B_{mp}$ relay.

From the above, it is seen that the system as thus far described will respond to pallets being deposited at a first position defined by the lever switch assembly 32 to energize the carriage 34 for traveling down the path until contact with a pallet is made. When contact is made, the carriage 34 will reverse direction and bring the pallet to the front of the path. It should also be clear that if a pallet was already stationed at the front of the path the carriage would deposit the pallet immediately adjacent thereto. When the carriage 34 encounters either the front of the path or a pallet the carriage disengages from the pallet and reverses its direction to search out additional pallets on the path if another pallet has already been placed at the first position. If no more pallets are no the path, the direction reversing circuitry being rendered inoperative will allow the carriage 34 to travel under the pallets adjacent to the front end of the path and come to a rest position at the front of the path.

If the system is at rest with two or more pallets resting adjacent to the shelf 134 and the pallet immediately adjacent to the shelf 134 is removed, the lever switch assembly 33 will close a contact 33a. The contact 33a will energize the $Z_c$ coil through the normally closed contact 59a of the limit switch 59, the contact 33a, diode 142 and the contact 61a of the front limit switch 61. The energization of the relay $Z_c$ will pull in the holding contact $Z_c$–1 as above described and therefore render the system again operative. The carriage 34 will then travel rightwardly down the path until a pallet is encountered. In this case, the first pallet encountered will be the one resting on the lever switch assembly 33. The carriage 34 would bring this pallet to the front of the path and then continue as above described traveling down the path and retrieving pallets until one final trip is made in which the carriage 34 reaches the point defined by the switch 59. If no pallet is resting at the first position the carriage 34 will be reversed by operation of the limit switch 62. The carriage 34 will then travel under the pallets resting adjacent to the front of the path and come to rest adjacent to the shelf 134.

If the carriage 34 is down towards the righthand end of the path bringing pallets to the left from the first station as defined by the lever switch assembly 32 and a pallet resting immediately adjacent thereto, the control circuit 133 will cancel the work being done at the righthand end of the path the next time the carriage is moving to the left if not already moving to the left. The carriage will then be brought to the shelf 134 immediately beginning to move the adjacent pallets up before returning to the righthand end of the path to bring new pallets down the path.

This is accomplished by a relay designed RR which is in series with the latch–1 contact. The latch–1 contact is opened when the carriage is moving to the left on the path. A normally closed contact RR–1 is in series with a relay coil of the DIS relay. Therefore, when the contact 33a of the lever switch assembly 33 is closed while the $Z_c$–1 contact is closed a path is developed from the lead 137 through the $Z_c$–1 contact, the contact 33a, a diode 143, the RR–1 contact and the coil of the DIS relay to the lead 136. The diode 143 provides rectification so that the DIS relay can be energized in an opposite polarity from the remaining DC circuitry. A capacitor 144 filters the DC provided by the diode 143. Operation of the DIS relay opens the DIS–1 contact and closes the DIS–2 contact. The opening of the DIS–1 contact de-energizes the $Z_{slv}$ relay opening contacts $Z_{slv}$–1 and $Z_{slv}$–2.

As discussed above the opening of the $Z_{slv}$–2 contact renders the direction changing circuitry of the system inoperative so that the carriage 34 under power of that supplied to the contact 61b and the $B_{mp}$ relay drives the carriage 34 to the shelf 134. When the carriage 34 arrives at the shelf 134, the contact 61b opens removing power from the motor 41 and closes the contact 61a.

The closing of the contact 61a re-energizes the $Z_{slv}$ relay through the DIS–2 contacts and a diode 146. Reenergization of the $Z_{slv}$ relay brings back in the contact $Z_{slv}$–2 which operates the latch–$C_1$ coil through the contact 57a which opens the RR–1 contact so that the DIS–2 contact is opened and the DIS–1 contact is again closed bringing this circuit back to its above described operating procedure. It is seen that in this way, the system will retrieve pallets left at a first position to fill a void when it occurs at the second position and will cancel an assignment of moving pallets from the first position towards the second position when a void is created at the second position.

An additional feature of this invention which is inherent from the configuration above described is that the system will not be energized to retrieve pallets if the entire path is filled. If pallets are placed on both sides of the lever switch assembly 32 indicating that pallets are filling the entire path, the switch 32 near the contact 32a will not be energized so that the carriage 34 will not move from its rest position under the shelf 134.

It should be understood that while this invention has been described with respect to a specific embodiment thereof, numerous others will become obvious to those of ordinary skill in the art in light of this disclosure.

What is claimed is:

1. A mechanism for transporting items, left at a first station, to a second station; said mechanism including:
   an item transporting carriage mounted for movement along a path, said path including said first and second stations, said carriage being engageable with said items for moving said items when moving towards said second station and being disengaged from said items when moving towards said first station;
   means responsive to a first control signal for moving said carriage towards said first station and to a second control signal for moving said carriage towards said second station;
   means responsive to an item resting at said first station for providing a first item signal;
   means on said carriage for sensing the proximity of an item when said carriage is moving along said path towards said first station to provide a first sensing signal;
   means on said carriage for sensing the proximity of at item when said carriage is moving along said path towards said second station to provide a second sensing signal; and
   means rendered effective by said first item signal responsive to said first and second sensing signals for providing said first and second control signals.

2. The mechanism as defined in claim 1 also including:
   means responsive to said carriage being present at a first position on said path;
   means responsive to said carriage being at said second station for providing a second station signal; and
   means rendered effective by said first limit signal responsive to said second station signal for disabling said first and second control signal providing means.

3. The mechanism as defined in claim 2 in which said first limit signal also renders said first and second control signal providing means non-responsive to said first and second sensing signal.

4. The mechanism as defined in claim 3 in which said item transporting carriage includes:
   means for engaging said items as said carriage moves from said first station to said second station; and
   means responsive to said second sensing signal for rendering said engaging means inoperative.

5. The mechanism as defined in claim 4 in which said first and second control signal providing means normally provides said first control signal.

6. The mechanism as defined in claim 5 in which said first and second control signal providing means provides said second control signal in response to said first sensing signal and said first control signal in response to said second sensing signal.

7. The mechanism as defined in claim 6 also including:
   means responsive to said carriage being present at a second position on said path, said second position being beyond said first position when looking from said second station, for providing a second limit signal; and said first and second control signal providing means is further responsive to said second limit signal for providing said second control signal.

8. The mechanism as defined in claim 1 also including:

means responsive to an item resting adjacent to said second station for providing a second item signal; and said first and second control signal providing means is rendered effective by either said first or second item signals.

9. The mechanism as defined in claim 8 also including:

means responsive to said carriage being present at a first position on said path, said first position being beyond said first station when looking from said second station, for providing a first limit signal;

means responsive to said carriage being at said second station for providing a second station signal; and means rendered effective by said first limit signal responsive to said second station signal for disabling said first and second control signal providing means.

10. The mechanism as defined in claim 9 in which said first limit signal also renders said first and second control signal providing means non-responsive to said first and second sensing signal.

11. The mechanism as defined in claim 10 in which said item transporting carriage includes:

means for engaging said items as said carriage moves from said first station to said second station; and means responsive to said second sensing signal for rendering said engaging means inoperative.

12. The mechanism as defined in claim 11 in which said first and second control signal providing means normally provides said first control signal.

13. The mechanism as defined in claim 12 in which said first and second control signal providing means provides said second control signal in response to said first sensing signal and said first control signal in response to said second sensing signal.

14. The mechanism as defined in claim 13 also including:

means responsive to said carriage being present at a second position on said path, said second position being beyond said first position when looking from said second station, for providing a second limit signal; and said first and second control signal providing means is further responsive to said second limit signal for providing said second control signal.

15. The mechanism as defined in claim 8 in which said first and second control signal providing means is rendered non-responsive to said first and second sensing signals by the simultaneous occurrence of said second control signal and said second item signal.

16. The mechanism as defined in claim 15 in which said item transporting carriage includes:

means for engaging said items as said carriage moves from said first station to said second station; and means responsive to said second sensing signal for rendering said engaging means inoperative.

17. The mechanism as defined in claim 16 also including:

means responsive to said carriage being present at a first position on said path, said first position being beyond said first station when looking from said second station, for providing a first limit signal;

means responsive to said carriage being at said second station for providing a second station signal; and means rendered effective by said first limit signal responsive to said second station signal for disabling said first and second control signal providing means.

18. The mechanism as defined in claim 17 in which said first limit signal also renders said first and second control signal providing means non-responsive to said first and second sensing signal.

19. The mechanism as defined in claim 18 in which said first and second control signal providing means normally provides said first control signal.

20. The mechanism as defined in claim 19 in which said first and second control signal providing means provides said second control signal in response to said first sensing signal and said first control signal in response to said second sensing signal.

21. The mechanism as defined in claim 20 also including:

means responsive to said carriage being present at a second position on said path, said second position being beyond said first position when looking from said second station, for providing a second limit signal; and said first and second control signal providing means is further responsive to said second limit signal for providing said second control signal.

22. A mechanism for transporting items, left at a first station, to a second station; said mechanism including:

an item transporting carriage mounted for movement along a path, said path including said first and second stations, said carriage being engageable with said items for moving said items when moving towards said second station and being disengaged from said items when moving towards said first station;

means responsive to a first control signal for moving said carriage towards said first station and to a second control signal for moving said carriage towards said second station;

means responsive to an item resting adjacent to said second station for providing a second item signal;

means on said carriage for sensing the proximity of an item when said carriage is moving along said path towards said first station to provide a first sensing signal;

means on said carriage for sensing the proximity of an item when said carriage is moving along said path towards said second station to provide a second sensing signal; and means rendered effective by said second item signal responsive to said first and second sensing signals for providing said first and second control signals.

23. The mechanism as defined in claim 22 also including:

means responsive to said carriage being present at a first position on said path;

means responsive to said carriage being at said second station for providing a second station signal; and means rendered effective by said first limit signal responsive to said second station signal for disabling said first and second control signal providing means.

24. The mechanism as defined in claim 23 in which said first limit signal also renders said first and second control signal providing means non-responsive to said first and second sensing signal.

25. The mechanism as defined in claim 24 in which said item transporting carriage includes:
means for engaging said items as said carriage moves from said first station to said second station; and
means responsive to said second sensing signal for rendering said engaging means inoperative.

26. The mechanism as defined in claim 25 in which said first and second control signal providing means normally provides said first control signal.

27. The mechanism as defined in claim 26 in which said first and second control signal providing means provides said second control signal in response to said first sensing signal and said first control signal in response to said second sensing signal.

28. The mechanism as defined in claim 27 also including:
means responsive to said carriage being present at a second position on said path, said second position being beyond said first position when looking from said second station, for providing a second limit signal; and
said first and second control signal providing means is further responsive to said second limit signal for providing said second control signal.

29. In a mechanism for transporting items:
means for defining a path upon which said items may be transported;
a pivot plate;
means for movably mounting said pivot plate in pivotal and limited translational relationship to said path;
means for urging said pivot plate into said path;
means for sensing the position of a portion of said pivot plate to indicate a predetermined pattern of items on said path adjacent to said pivot plate to provide a first item signal;
an item transporting carriage mounted for movement along said path;
means responsive to a first control signal for moving said carriage in a first direction along said path and to a second control signal for moving said carriage in a second direction along said path;
means rendered effective by said first item signal for providing said first and second control signal;
means on said carriage for sensing the proximity of an item when said carriage is moving along said path in said first direction to provide a first sensing signal;
means on said carriage for sensing the proximity of an item when said carriage is moving along said path in said second direction to provide a second sensing signal; and
said first and second control signal providing means is responsive to said first and second sensing signals.

30. In a mechanism as defined in claim 29 in which said carriage is engageable with said items for moving said items when moving in said first direction and is disengaged from said items when moving in said second direction.

31. A mechanism for transporting items; said mechanism including:
an item transporting carriage mounted for movement along a path;
means responsive to a control signal for moving said carriage along said path;
a guy wire extending along said path, said guy wire normally being under a predetermined tension;
means mounted on said carriage for sensing the proximity of items to said carriage to alter the tension on said guy wire; and
means responsive to said tension on said guy wire for generating said control signal.

32. The mechanism as defined in claim 31 also including:
means responsive to an item resting at a predetermined position on said path for generating an item signal; and
said control signal generating means is rendered effective by said first item signal.

33. The mechanism as defined in claim 32 in which said item signal generating means includes:
a pivot plate;
means for movably mounting said pivot plate in pivotal and limited translational relationship to said path;
means for urging said pivot plate into said path; and
means for sensing the position of a portion of said pivot plate to indicate a predetermined pattern of items on said path thereby provides said item signal, said predetermined pattern including an item resting at said predetermined position on said path.

34. The mechanism as defined in claim 31 in which said means responsive to said tension on said guy wire includes:
an actuator member mounted for pivotal motion around a point fixed with respect to said path;
means for applying a pivoting force to pivot said actuator member;
means for connecting said guy wire to said actuator member to balance said pivoting force; and
means responsive to said pivotal position of said actuator member to provide an indication of said tension on said wire.

35. The mechanism as defined in claim 34 also including:
means responsive to an item resting at a predetermined position on said path for generating an item signal; and
said control signal generating means is rendered effective by said first item signal.

36. The mechanism as defined in claim 35 in which said means responsive to said tension on said guy wire includes:
an actuator member mounted for pivotal motion around a point fixed with respect to said path;
means for applying a pivoting force to pivot said actuator member;
means for connecting said guy wire to said actuator member to balance said pivoting force; and means responsive to said pivotal position of said actuator member to provide an indication of said tension on said wire.

37. In a system for transporting an item:
means for defining a path, said path defining means having a surface along said path for supporting said item; said surface defining a supporting region thereabout;
a carriage mounted for movement along said path, said movement of said carriage being adjacent to but not intersecting with said region;
item engaging means movably mounted on said carriage for simultaneous limited movement (1) into and out of said region and (2) along said path relative to said carriage;
means for biasing said item engaging means into said region;
means for sensing the proximity of said item as said carriage moves in a first direction on said path to withdraw said item engaging means from said region; and
ratchet means responsive to said item engaging means engaging an item for holding said item engaging means in said path, said ratchet means being released by operation of said sensor means.

38. In a system for transporting an item:
means for defining a path, said path defining means having a surface along said path for supporting said item; said surface defining a supporting region thereabout;
a carriage mounted for movement along said path, said movement of said carriage being adjacent to but not intersecting with said region;
item engaging means movably mounted on said carriage for simultaneous limited movement (1) into and out of said region and (2) along said path relative to said carriage;
means for biasing said item engaging means into said region;
said item is transported from a first station on said path to a second station on said path, and said item engaging means is mounted to move towards said first station relative to said carriage as said item engaging means moves into said region, said system also including:

means responsive to a first control signal for moving said carriage towards said first station and to a second control signal for moving said carriage towards said second station;
means responsive to an item resting at said first station for providing a first item signal, and
means rendered effective by said first item signal for providing said first and second control signal.

39. In the system as defined in claim 47 in which said item signal providing means includes:
a pivot plate;
means for movably mounting said pivot plate in pivotal and limited translational relationship to said path;
means for urging said pivot plate into said region; and
means for sensing the position of a portion of said pivot plate to indicate a predetermined pattern of items on said path thereby providing said item signal.

40. In the system as defined in claim 39 also including:
means on said carriage for sensing the proximity of said item when said carriage is moving along said path towards said first station to provide a first sensing signal;
means on said carriage for sensing the proximity of an item when said carriage is moving along said path towards said second station to provide a second sensing signal; and
said first and second control signal providing means is responsive to said first and second sensing signal.

41. In the system as defined in claim 40 in which said second sensing signal withdraws said item engaging means from said region.

42. In the system as defined in claim 41 also including:
a guy wire extending along said path, said guy wire normally being under a predetermined tension; and
said first and second sensing signal providing means alters the tension on said guy wire to transmit said first and second sensing signals to said first and second control signal providing means.

* * * * *